United States Patent [19]
Andrews

[11] 3,895,884
[45] July 22, 1975

[54] TORQUE SENSITIVE PITCH LOCK

[75] Inventor: Merritt B. Andrews, Westfield, Mass.

[73] Assignee: United Aircraft Corporation, East Hartford, Conn.

[22] Filed: July 5, 1974

[21] Appl. No.: 486,023

[52] U.S. Cl. .................................... 416/153; 416/43
[51] Int. Cl.² ........................................ B64C 11/34
[58] Field of Search .............................. 416/43, 153

[56] References Cited
UNITED STATES PATENTS

| | | | |
|---|---|---|---|
| 2,959,228 | 11/1960 | Larkin et al. | 416/43 |
| 2,974,730 | 3/1961 | Voisard | 416/43 X |
| 2,988,153 | 6/1961 | Haworth et al. | 416/43 |
| 3,186,492 | 6/1965 | Chillson et al. | 416/43 X |
| 3,187,819 | 6/1965 | Barnes et al. | 416/153 |
| 3,672,788 | 6/1972 | Ellinger | 416/43 |

FOREIGN PATENTS OR APPLICATIONS

| | | | |
|---|---|---|---|
| 662,719 | 5/1963 | Canada | 416/153 |

Primary Examiner—Everette A. Powell, Jr.
Attorney, Agent, or Firm—Norman Friedland

[57] ABSTRACT

This invention is concerned with pitch lock of the variable pitch fan blades of a propulsor whose pitch is varied by a rotary type actuator and where the pitch lock input signal is manifested by a negative torque reaction imparted by the blades.

4 Claims, 2 Drawing Figures

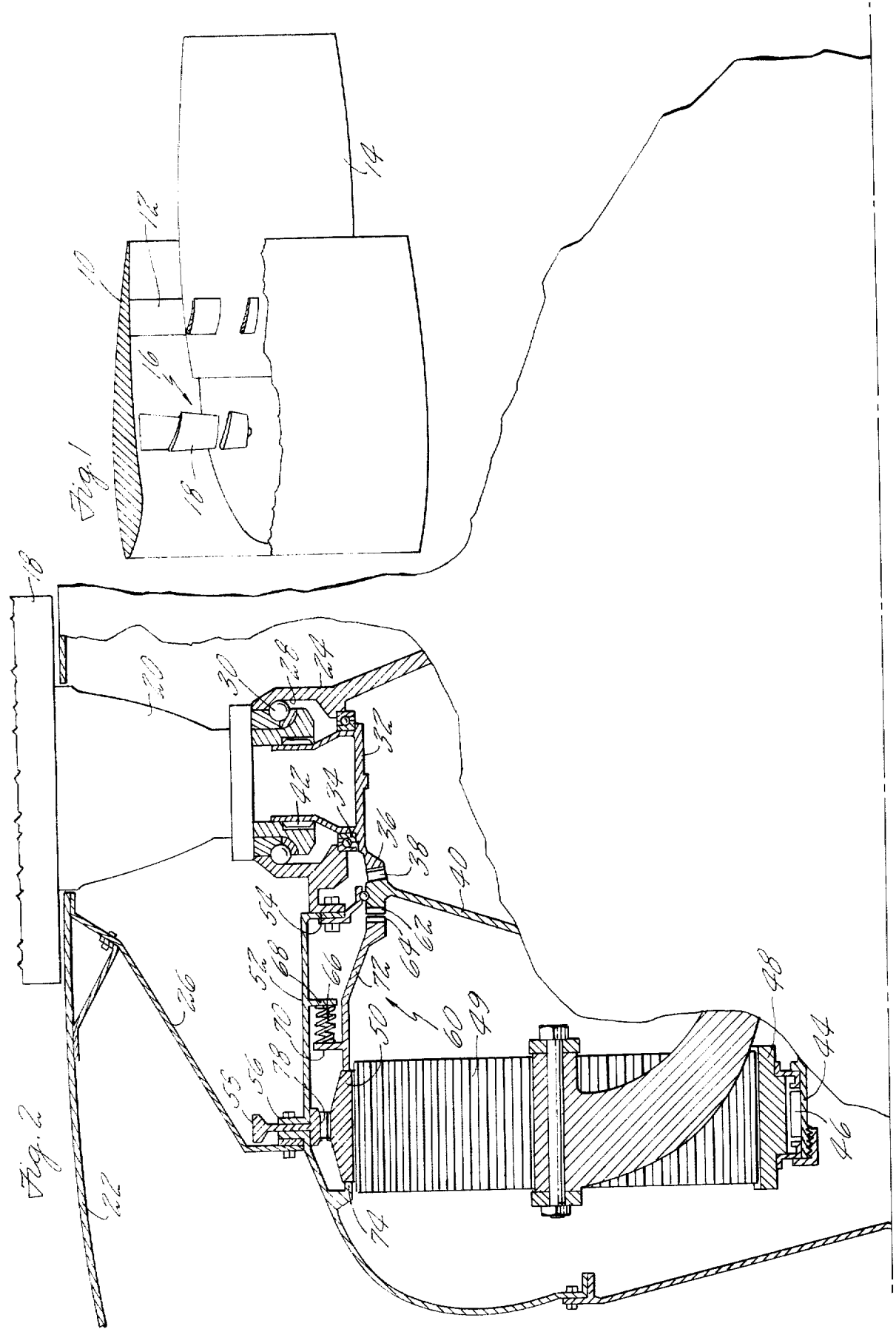

TORQUE SENSITIVE PITCH LOCK

BACKGROUND OF THE INVENTION

This invention relates to variable pitch fan propulsors and particularly to pitch locks for preventing the blades to retard to a lower blade angle in the event a negative torque is imparted to the fan driving mechanism.

As is generally well known in the art it is customary to equip variable pitch propellers particularly those driven by a turbine type power plant with pitch lock. The pitch lock serves to prevent the blades from retarding to a lower blade angle in the event of a malfunction to prevent severe over-speed conditions. Customarily, the pitch lock which is held out of engagement during normal operation is actuated by a speed sensed actuating valving and the like to regulate the pressure behind a pitch lock actuating piston. Typically, pressurized fluid holds the teeth of the pitch lock mechanism out of engagement and upon actuation, the fluid is bled from behind the piston which is spring loaded to engage the pitch lock teeth.

While such systems are adequate in many installations, I have found that I can obtain a more efficacious system which is characterized as involving a minimum of parts and provided for a blade locking signal at the point of energy extraction from the air stream rather than the violation of a set overspeed condition. It is, however, to be understood that many of the pitch lock elements may be common in both the present invention and heretofore known systems. As for example, the pitch lock in certain blade angle regimes, as reverse will have detents to avoid locking. The present invention contemplates actuating pitch lock by a negative torque manifestation of the blades and the utilization of a helical spline disposed between the ring gear of the power drive gear trains and the hub or hub connector, such that the negative torque causes the spline to displace axially to which preferably is mechanically connected to one of the pitch lock gears for effectuating engagement.

Moreover, by utilizing the negative torque as an actuating signal the problem of initiating pitch lock after an overspeed signal is sensed as is the case of heretofore known pitch locks, is obviated. Thus, in the conventional, heretofore known pitch lock system the fan stage could be delivering energy to the accelerating low pressure turbine through topping governor settings and beyond, up until the increased fan speed results in a positive angle of attack of the blading.

By triggering pitch locking from a negative torque signal or more precisely low positive torque, min. flight idle values, pitch loss will be limited to that angle which would instantly add energy to the low pressure turbine. Thus, no failure mode could result in overspeeds beyond that which would occur from a shaft failure. Furthermore, by using negative raked pitch lock teeth, when this low torque dissipated due to increased rpm, the blades would still be locked and the fan stage would now absorb energy limiting additional overspeeds.

SUMMARY OF THE INVENTION

An object of this invention is to provide for a variable pitch ducted fan propulsor an improved pitch lock.

A still further object of this invention is to provide for a variable pitch ducted fan propulsor a pitch lock that is activated by a negative torque manifested by the blades of the fan.

Other features and advantages will be apparent from the specification and claims and from the accompanying drawing which illustrates an embodiment of the invention.

BRIEF DESCRIPTION OF THE DRAWING

FIG. 1 is a side elevation view illustrating a typical ducted fan propulsor.

FIG. 2 is a partial view, partly in elevation and partly in section illustrating its details of the invention.

DESCRIPTION OF THE PREFERRED EMBODIMENT

As can be seen by referring to FIG. 1 the propulsor to which this invention is particularly applicable is a ducted fan having bypass duct 10 supported by a plurality of vanes 12 to the engine casing 14. The engine which may be any suitable type is preferably a turbine power plant, and drives the variable pitch fan 16 which has a plurality of variable pitch circumferentially spaced blades 18. An example of a suitable fan propulsor is disclosed in T. F. McDonough and my joint U.S. patent application Ser. No. 334,350 filed on Feb. 21, 1973 entitled "Modular Gearbox for Variable Pitch Fan Propulsor" and assigned to the same assignee. Variable pitch ducted fans are well known and the detailed description is omitted herefrom for the sake of clarity and simplicity. However, suffice it to say that the fan serves to accelerate the air within the duct and a portion of the air is ingested into the engine while the remainder is bypassed past the vanes 12. The pitch is varied in order to maximize performance for the operating regimes of the aircraft and may or may not be adjustable to the reverse position.

This invention is particularly efficacious for an application where the pitch change mechanism is a rotary actuator as is the case in the U.S. patent application Ser. No. 334,350 supra. As can be seen by referring to FIG. 2 the root 20 of blade 18 extends beyond spinner 22 which is supported to the hub 24 by bulkhead 26, where it is supported in the cylindrical recess 28 formed in hub 24. Suitable retaining mechanism including a locking ring 30 rotatably supports the blades in position. In this embodiment root of blade 18 is internally splined to the gear support mechanism 32 rotatably supported by bearing 34 to the hub 24. The gear segment 36 mates with ring gear 38 which is carried by element 40. In the preferred embodiment element 40 is a portion of the rigid spline of a harmonic drive but for all intent and purposes element 40 may be considered a portion of any type of rotary actuator.

From the foregoing it is apparent that pitch change movement is effectuated by rotating elements 40 relative to hub 24 which in turn rotates gear support mechanism 32 through segment gear 36 and blade 18 through the spline 42. Obviously, the other blades are likewise and simultaneously actuated to obtain uniform pitch change movement.

The main rotary drive of the fan is taken off of the drive shaft 44 driven by the engine which through spline 46 drives the sun gear 48 of the main planetary gearbox. The sun gear 48 in turn drives ring gear 50 through planetary gear 49 which is suitably connected to hub 24 by the hub connector 52. Hub connector 52 carries flanges 54 and 56 which are bolted to hub 24 and spline ring 58. In this manner power is supplied to the fan through the main drive shaft.

In accordance with this invention a pitch lock generally illustrated by numeral 60 is included and serves to prevent the blades 18 from retarding to a lower blade angle upon a negative torque input manifested by blades 18. The pitch lock gears 62 and 64, which may be any suitable well known type having a negative rake to permit increased pitch when engaged, but preventing lower blade angles. As shown in this embodiment the teeth 64 and 62 are held out of engagement by the force of spring 66 which has one end bearing against depending arm 68 extending from hub connector 52 and the other end bearing against depending arm 70 urging element 72 leftwardly. The end of element 72 bears against ring gear 50 which during normal operation abuts against projection 74.

A helical spline 78 which may be any well known type is disposed between spline support 58 and ring gear 50 and serves to transmit rotary motion between the gearbox and hub 24. Helical spline 78 is particularly selected because the shape of the spline will cause the spline element attached to ring gear 50 to move rightwardly when torque is reversed. This will position element 72 rightwardly and cause the teeth 64 and 62 to engage to effectuate pitch lock.

It is apparent from the foregoing that pitch lock will occur whenever a negative torque manifested by the blades 18 is evidenced. Hence, should a malfunction occur such that the fan blades 18 begin to extract power from the airstream rather than absorb engine power, a negative torque will ensue and when this force overcomes the predetermined pitch lock disengagement force provided by spring 66 in this instance although it may be a hydraulic force as is typical in propeller installations, pitch lock will take place. It should be noted that through the use of a hydraulic cylinder force rather than the spring force a variable torque pitch lock setting may be accomplished by scheduling cylinder pressure. It is also obvious to one familiar with this art that by using spring and/or hydraulic preloading arrangements pitch locking may be initiated at many values or torque including positive values. Disengagement of pitch lock will be effected by commanding an increase pitch, unlocking the negatively raked pitch lock teeth 64, 62.

It should be understood that the invention is not limited to the particular embodiments shown and described herein, but that various changes and modifications may be made without departing from the spirit or scope of this novel concept as defined by the following claims.

I claim:

1. For a fan propulsor having a hub rotatably supporting a plurality of circumferential blades mounted therein for pitch change movement, means including a rotary actuator having connection means connected to said blades for imparting pitch change movement, a pitch lock element on said connection means and movable therewith, a retractable pitch lock element normally urged out of engagement with said pitch lock element and means responsive to the blades when they are extracting energy out of the airstream for engaging said pitch lock elements to prevent the pitch from going to a lower blade angle.

2. For a fan propulsor as claimed in claim 1 including a drive shaft, a main gearbox having a ring gear interconnecting said hub and said drive shaft, spline means between said hub and ring gear normally transmitting rotary movement to said hub, and said spline functioning to displace said ring gear axially to engage said pitch lock elements.

3. For a fan propulsor as claimed in claim 2 wherein said spline is of the helical type.

4. For a fan propulsor as claimed in claim 3 including an arm projecting from said retractable pitch lock element to abut against said ring gear.

* * * * *